United States Patent Office 3,592,806
Patented July 13, 1971

3,592,806
BASIC AZO DYESTUFFS CONTAINING A QUATERNIZED N-ALKYL-N - β-(IMIDAZOLYL) LOWER ALKYLARYLAMINE GROUP
Masao Iizuka, Kyokuji Arakawa, and Yoshiaki Yamamoto, Tokyo, Japan, assignors to Hodogaya Kagaku Kabushiki Kaisha, Tokyo, Japan
No Drawing. Filed Dec. 12, 1967, Ser. No. 689,780
Claims priority, application Japan, Dec. 19, 1966, 41/82,738
Int. Cl. C09b 29/36, 62/82; D06p 1/02
U.S. Cl. 260—157                    14 Claims

ABSTRACT OF THE DISCLOSURE

A basic dyestuff of the formula:

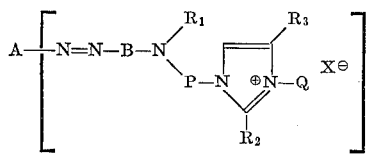

wherein:

A is a residue selected from the group consisting of substituted and unsubstituted benzenes, diphenyls, diphenylmethanes, azobenzenes, thiazoles, benzothiazoles, thiadiazoles, triazoles, and derivatives thereof, wherein the substituents are non-water-solubilizing substituents selected from the group consisting of chlorine, bromine, nitrile, nitro, acetyl, trifluoromethyl, lower alkylsulphonyl, sulphonamide, mono- and di-lower alkylsulphonamide, lower alkoxycarbonyl, acetylamino, phenylamino, phenyl, lower alkyl and lower alkoxy;

B is a radical selected from the group consisting of substituted and unsubstituted phenylene and naphthylene radicals bonded to the azo and the amino groups in the 1- and 4-positions, wherein the substituents are non-water-solubilizing substituents selected from the group consisting of chlorine, methyl, methoxy and acetylamino;

$R_1$ is a member selected from the group consisting of lower alkyl having from 1 to 4 carbon atoms, β-cyanoethyl, β-hydroxyethyl and benzyl;

$R_2$ and $R_3$ each is a member selected from the group consisting of hydrogen, methyl, ethyl and phenyl;

P is an alkylene radical having from 2 to 3 carbon atoms;

Q is a member selected from the group consisting of lower alkyl, benzyl and carbamoylethyl;

X is an anion; and n is 1 or 2.

The dyestuffs of the present invention are useful as dyes for a wide variety of materials, including tanned cellulosic fibers, silk, leather, cellulose acetate, paper, and synthetic fibers, especially polymeric and copolymeric acrylonitrile. The dyestuff of the present invention is particularly suitable for dyeing polyacrylonitrile fibers with excellent light, wet, and heat-fastness properties.

The present invention relates to new cationic dyestuffs. More particularly, the present invention relates to new useful cationic dyestuffs, which are preferably used for dyeing fibres made from polyacrylonitrile and copolymers thereof.

According to the invention, there are provided novel azo-dyestuffs, free from carboxylic acid and sulphonic acid groups, which have the following general Formula 1

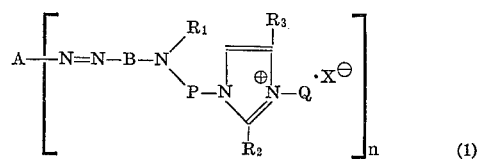

wherein A represents a residue of a diazotizable primary aromatic or heterocyclic amine which may be substituted by non-water-solubilizing substituents selected from the group consisting of chlorine, bromine, nitrile, nitro, acetyl, trifluoromethyl, lower alkylsulphonyl, sulphonamide, mono- and di-lower alkylsulphonamide, lower alkoxycarbonyl, acetylamino, phenylamino, phenyl, lower alkyl and lower alkoxy, B represents a phenylene or naphthylene radical bonded to the azo and amino groups in the 1- and 4-positions, which may contain non-water-solubilizing substituents selected from the group consisting of chlorine, methyl, methoxy and acetylamino, $R_1$ represents a lower alkyl group having from 1 to 4 carbon atoms, or a substituted alkyl group selected from the group consisting of β-cyanoethyl, β-hydroxyethyl and benzyl, $R_2$ and $R_3$ each represents a member selected from the group consisting of hydrogen, methyl, ethyl and phenyl, P represents a linear or branched alkylene radical having from 2 to 3 carbon atoms, Q represents a group selected from lower alkyl, benzyl and carbamoylethyl, X represents an anion equivalent to a cation and n represents 1 or 2.

The dyestuffs of the invention represented by the above Formula 1 can be prepared by coupling the diazonium or tetrazonium compounds derived from aromatic or heterocyclic primary amines with the azo component of the Formula 2

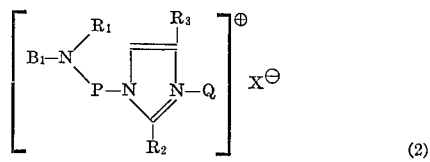

(in which $B_1$ is a benzene or naphthalene residue which is free of substituents in the p-position to the amino group, but which may contain non-water-solubilizing substituents selected from the group consisting of chlorine, methyl, methoxy and acetylamino groups, and $R_1$, $R_2$, $R_3$, P, Q and X have the meanings defined above) or by treating the dyestuff represented by the general Formula 3

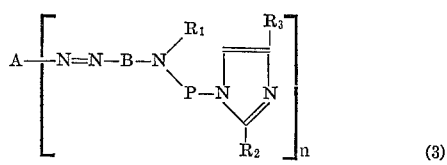

(in which A, B, $R_1$, $R_2$, $R_3$, P and n have the meanings defined above), which can be prepared by coupling the afore-said diazonium or tetrazonium compounds with the azo component of the Formula 4

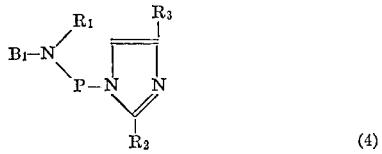

(in which $B_1$, $R_1$, $R_2$, $R_3$, and P have the meanings defined above), with a quaternizing agent.

In the aforementioned Formulas 1 and 2, the anion represented by X is equivalent to the cation and generally derived from a strong inorganic or organic acid, for example, from hydrochloric acid, hydrobromic acid, sulphuric acid, sulphuric acid monomethyl or ethyl ester, benzene sulphonic acid or toluene sulphonic acid. Chlorine, bromine, methosulphate, ethosulphate and p-toluene sulphonate ions are the most preferable anions. The aforesaid anions introduced into the dyestuff molecule during the process may be exchanged for anions of other inorganic acids, for example, phosphoric acid, sulphuric acid or an organic acid, such as, formic acid, acetic acid, chloroacetic acid, oxalic acid, lactic acid or tartaric acid.

In certain cases free bases may be used. Often the production and use of a double salt with inorganic salts is advantageous, in particular the zinc chloride double salt.

The residue of a diazotizable primary amine represented by A in the above Formula 1 is derived from aromatic and heterocyclic amines such as anilines, benzidines, diaminodiphenylmethanes, aminoazo compounds, amino thiazoles, amino benzothiazoles, amino thiadiazoles, amino triazoles and their derivatives. As specific examples of some suitable diazo components, there may be mentioned 2-chloro-4-nitroaniline,
p-nitroaniline,
2,4,5-trichloroaniline,
2,4,6-trichloroaniline,
p-amino acetophenone,
2-trifluorometyl-4-chloroaniline,
2-ethylsulphonyl-5-trifluoromethylaniline,
2-methoxy-5-diethylamino-sulphonylaniline,
2-chloro-4-methoxy-carbonylaniline,
p-acetylaminoaniline,
2-chloro-4-methylsulphonylaniline,
2-chloroaniline-4-sulphonamide,
4-amino-4'-methoxydiphenylamine,
p-aminodiphenyl,
benzidine,
4,4'-diaminodiphenylmethane,
2-methoxy-4-(3'-nitrophenyl)azo-5-methylaniline,
2,6-dichloro-4-nitroaniline,
2,4-dinitroaniline,
2,4-dinitro-6-bromoaniline,
2-cyano-4-nitroaniline,
2-methylsulphonyl-4-nitroaniline,
2,4-dicyano-6-chloroaniline,
5-nitro-2-aminothiazole,
5-nitro-4-methyl-2-aminothiazole,
3-phenyl-5-amino-1,2,4-thiadiazole,
2-phenyl-5-amino-1,3,4-thiadiazole,
3-phenyl-5-amino-1,2,4-triazole,
6-cyano-2-aminobenzothiazole,
o-chloro-2-aminobenzothiazole,
4-methyl-6-nitro-2-aminobenzothiazole,
6-methylsulphonyl-2-aminobenzothiazole,
6-acetylamino-2-aminobenzothiazole,
6-phenyl-2-aminobenzothiazole and the like.

On the other hand, the azo components described in the aforementioned Formulas 2 and 4 are amines of the benzene and naphthalene series which are free from sulphonic acid and carboxylic acid groups, and which may contain substituents such as chlorine, methyl, methoxy or acetylamino groups at any position except at the p-position to the amino group in ring $B_1$.

Suitable alkylene radicals, represented by p, are
—$CH_2$—$CH_2$— or $$-CH_2-\overset{\overset{\displaystyle CH_3}{|}}{CH}-$$

As the substitutent $R_1$, an alkyl radical, for example, a methyl, ethyl or butyl radical, a substituted alkyl radical, for example, β-cyanoethyl, β-hydroxyl-ethyl or benzyl are preferable. Both $R_2$ and $R_3$ are substitutents present on the imidazole ring bonded to P, and they can be methyl, ethyl or phenyl radicals.

The azo components of the Formula 4 are, for example, prepared by reacting a compound of the formula:

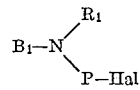

(in which $B_1$, $R_1$ and P have the meanings defined above, and Hal represents a chlorine or bromine atom) with an imidazole compound in the presence of an alkali material.

Imidazole, 2-ethylimidazole, 2-phenylimidazole, 2,4-dimethylimidazole, 2-ethyl-4-methylimidazole and especially 2-methylimidazole are suitable for use as the imidazole compounds.

The following are representative of the azo components which may be employed in production of the dyestuffs of this invention;

N-ethyl-N-β-(2'-methylimidazolyl-1')ethylaniline,
N-butyl-N-β-(2'-methylimidazolyl-1')ethylaniline,
N-methyl-N-β-(2'-methylimidazolyl-1')ethylaniline,
N-ethyl-N-β-(2'-methylimidazolyl-1')ethyl-m-toluidine,
N-methyl-N-β-(2'-methylimidazolyl-1')ethyl-m-toluidine,
N-methyl-N-β-(2'-methylimidazolyl-1')-N'-acetyl-m-phenylenediamine,
N-ethyl-N-β-(2'-methylimidazolyl-1')ethyl-2-methoxy-5-methylaniline,
N-β-cyanoethyl-N-β-(2'-methylimidazolyl-1')ethylaniline,
N-ethyl-N-β-(2'-methylimidazolyl-1')ethyl-α-naphthylamine,
N-methyl-N-β-(imidazolyl-1')ethylaniline,
N-methyl-N-β-(imidazolyl-1')ethyl-m-chloroaniline,
N-benzyl-N-β-(imidazolyl-1')ethylaniline,
N-methyl-N-β-(imidazolyl-1')propylaniline,
N-butyl-N-β-(imidazolyl-1')ethyl-m-toluidine,
N-methyl-N-β-(imidazolyl-1')ethyl-m-toluidine,
N-ethyl-N-β-(2'-ethylimidazolyl-1')ethyl-m-toluidine,
N-β-cyanoethyl-N-β-(2',4'-dimethylimidazolyl-1')ethylaniline,
N-β-hydroxyethyl-N-β-(2'-ethyl-4'-methylimidazolyl-1')ethylaniline, and
N-ethyl-N-β-(2'-phenylimidazolyl-1')ethyl-m-toluidine.

The azo components of Formula 2 can be prepared by treating the compounds of Formula 4 with a quaternizing agent. This procedure is almost the same as where the dyestuffs of Formula 3 are treated with the quaternizing agent. Namely, this process is ordinarily carried out by heating the compounds of Formulas 4 and 3 with an alkylating or aralkylating agent in an inert organic solvent, such as benzene, toluene, xylene, chloroform, carbon tetrachloride, tetrachloroethane, chlorobenzene, o-dichlorobenzene, methanol, ethanol, dioxane, nitrobenzene or dimethyl formamide.

Instead of using the inert solvent, and excess of the alkylating or aralkylating agent may be employed.

Representative alkylating and aralkylating agents include alkyl halide, aralkyl halide or the alkylesters of sulphuric acid or an organic sulphonic acid. Examples of these materials are dimethylsulphate, diethylsulphate, benzene sulphonic methylester, p-toluene sulphonic methylester, ethyl- or butylester, methylchloride, methylbromide, ethylbromide and benzyl chloride, which are preferably used.

Another excellent quaternizing method is to use an α,β-unsaturated compound in an appropriate solvent in the presence of a proton. As the solvent, ethanol, dimethyl formamide, dioxane, formic acid or acetic acid is suitable, and as the proton, an inorganic acid such as hydrochloric acid, sulphuric acid or hydrobromic acid, or an organic acid such as glacial acetic acid, benzene sulphonic acid or toluene sulphonic acid is also suitable. Furthermore, as the α,β-unsaturated compound, acrylic amide, methacrylic amide, vinylketone or vinylether can be used, and among them, acrylic amide is especially suitable.

The present reaction is in itself an exothermic reaction, but heating is necessary to initiate the reaction. The reaction is preferably carried out at an elevated temperature.

The azo coupling reaction of the invention can be carried out by a known method, for example, in a neutral to acidic aqueous medium, and if necessary, in the presence of a buffer agent such as sodium acetate or sodium carbonate.

According to the invention, diazo dyestuffs are obtained by using an amine-containing azo group such as an aminoazo compound, or a diamine capable of being tetraazotized such as those of the benzidine, diphenylmethane and heterocyclic series, wherein an equivalent amount of the azo component is used.

The dyestuff salts thus obtained are then readily separated from the reaction mixture by filtration, because of the precipitation in an inert organic solvent. These solvents are also stripped by distillation, such as vacuum distillation or steam distillation. In the case of using water-miscible solvents, they may be diluted with water and then salted out to separate the dyestuff salts. The dyestuff salts formed by the azo coupling reaction may be recovered by filtration when they are precipitated, or they may be salted out to precipitate by adding sodium chloride into the reaction mixture, if desired. The resulting dyestuffs may be advantageously purified by dissolving in hot water, and any impure matter can be filtered off as an insoluble residue. From the filtrate the dyestuff can be precipitated by adding sodium chloride. Zinc chloride may be also added to form double salts which are recovered with ease.

New basic dyestuffs obtained by the invention are soluble in water, and their aqueous solutions are preferably applied for dyeing a very wide variety of materials, for example, tanned cellulosic fibres, silk, leather, cellulose acetate, paper and synthetic fibres, especially polymeric and copolymeric acrylonitrile. Particularly, the new dyestuffs dye polyacrylonitrile fibres with excellent light, wet and heat fastness properties.

The following examples illustrate the invention, but the invention is not intended to be limited to them. Where not otherwise mentioned, the parts and percentages are given therein as parts by weight and percent by weight respectively.

EXAMPLE 1

A mixture of 17.3 parts of 2 - chloro-4-nitroaniline, 47 parts of 36% hydrochloric acid and 110 parts of water is stirred at room temperature for 2 hours, and then cooled to 0° to 5° C. by the addition of 130 parts of ice, and the amine is diazotized with a solution of 7 parts of sodium nitrite and 30 parts of water. After stirring for 1 hour, a small amount of aminosulphonic acid is added to remove an excess of nitrous acid present. The diazo solution is then run into a solution of 36 parts of the compound of the formula:

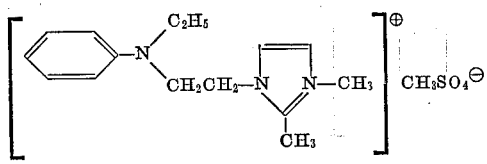

in 400 parts of water and 150 parts of ice at 0–5° C. The whole is stirred for 1 hour, then 20.5 parts of sodium acetate are added. After the coupling mass is stirred for several hours, 40 parts of sodium chloride are added. The precipitated dyestuff is filtered off under suction, and then dried. 47.8 parts of the dyestuff of the following formula:

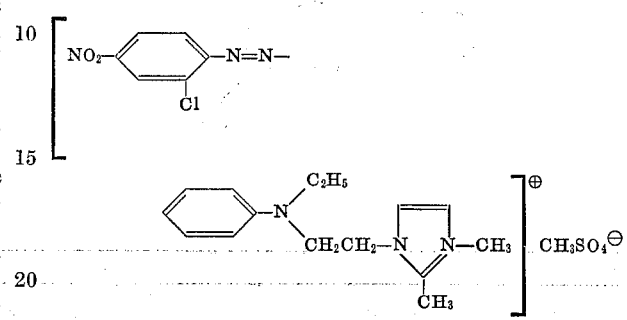

are obtained. The dyestuff salt is soluble with a red colour, and dyes polyacrylonitrile fibres from a weak dye bath in red shades which have good light and wet fastness properties.

The same dyestuff is obtained by the following procedure. The diazonium salt solution prepared from 17.3 parts of 2-chloro-4-nitro-aniline using the procedure given in Example 1, is poured into a solution of 23 parts of the compound of the formula:

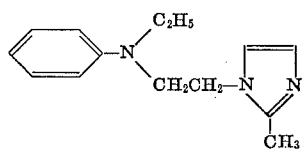

in 400 parts of water, 150 parts of ice and 11 parts of hydrochloric acid, and stirred at 0–5° C. for 1 hour. Into the reaction mixture, a solution of 19 parts of sodium carbonate in 160 parts of water is added to bring the pH to about 5, and the whole is made alkaline by the addition of 40 parts of a 10% sodium hydroxide solution, and then 100 parts of sodium chloride are added. The precipitated dyestuff is filtered off and dried. 33 parts of the dyestuff having the following formula:

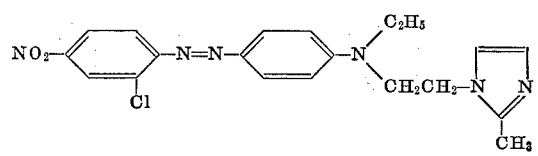

are obtained. 14.7 parts of dimethyl sulphate are added to a solution of the dyestuff in 600 parts of chloroform and the mixture is then boiled for 2 hours under reflux. After cooling, the precipitate is filtered off, and dissolved in 1000 parts of water, at 80° C., and clarified with 1 part of active carbon. The dye salt is precipitated from the filtered solution with 50 parts of sodium chloride, filtered and dried. The dyestuff so obtained is equal to the one obtained before.

The azo component used is, for example, prepared as follows: 18.5 parts of N-ethyl-N-β-chloroethylaniline are added to a solution of 8.6 parts of 2-methylimidazole in 42 parts of 10% sodium hydroxide solution, and stirred at 105–106° C. for 5 hours. Benzene is added to the reaction mass, and the whole is then allowed to stand. The oily layer is separated, and then distilled in a vacuum to give the compound which boils at 186–188° C. at 4 mm. Hg and has the following formula:

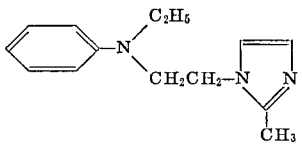

This compound is treated with a little excess of dimethyl sulphate in chlorobenzene at 95–100° C. for 3 hours to yield the quaternary compound of the formula:

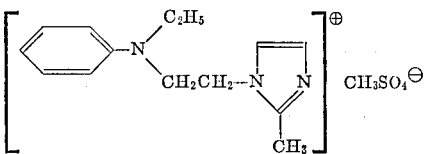

In similar manner as in Example 1 using the starting materials shown in the following table, dyestuffs are obtained which have similar dyeing properties. In the right column of this table are given the shades of colour of the dyeing on polyacrylonitrile fibres.

| Ex. | Diazo component | Azo component | Shade |
|---|---|---|---|
| 2 | $O_2N-\underset{}{C_6H_4}-NH_2$ | [3-methylphenyl-N(C_2H_5)(CH_2CH_2-imidazolium with N-CH_3, C_2H_5)] Cl$^\ominus$ | Yellowish Red. |
| 3 | 2,4,5-trichloroaniline | [phenyl-N(CH_3)(CH_2CH_2-imidazolium with N-CH_3, CH_3)] CH_3SO_4$^\ominus$ | Orange. |
| 4 | 2,4,5-trichloroaniline | [phenyl-N(C_4H_9)(CH_2CH_2-imidazolium with N-CH_3, CH_3)] CH_3SO_4$^\ominus$ | Yellow. |
| 5 | $H_3COC-\underset{}{C_6H_4}-NH_2$ | [3-chlorophenyl-N(CH_3)(CH_2CH_2-imidazolium with N-C_2H_5, C_2H_5)] Br$^\ominus$ | Orange. |
| 6 | $Cl-\underset{CF_3}{C_6H_3}-NH_2$ | [phenyl-N(CH_2CH_2CN)(CH_2CH_2-imidazolium with CH_3, N-CH_3, CH_3)] By$^\ominus$ | Yellowish orange. |
| 7 | $\underset{SO_2C_2H_5}{\overset{CF_3}{C_6H_3}}-NH_2$ | [phenyl-N(CH_3)(CH_2CH_2-imidazolium with N-CH_2-phenyl)] Cl$^\ominus$ | Orange. |
| 8 | $\underset{SO_2N(C_2H_5)_2}{\overset{OCH_3}{C_6H_3}}-NH_2$ | [3-methylphenyl-N(C_2H_5)(CH_2CH_2-imidazolium with N-CH_3, phenyl)] CH_3SO_4$^\ominus$ | Do. |
| 9 | $H_3COOC-\underset{Cl}{C_6H_3}-NH_2$ | [3-(NHCOCH_3)phenyl-N(CH_3)(CH_2CH_2-imidazolium with N-CH_3, CH_3)] Cl$^\ominus$ | Red. |
| 10 | $H_3COCHN-\underset{}{C_6H_4}-NH_2$ | [2-OCH_3,5-CH_3-phenyl-N(C_2H_5)(CH_2CH_2-imidazolium with N-CH_3, CH_3)] CH_3SO_4$^\ominus$ | Red. |

| Ex. | Diazo component | Azo component | Shade |
|---|---|---|---|
| 11 | H₃O₂S—C₆H₃(Cl)—NH₂ | [structure with Bf⊖] | Orange. |
| 12 | O₂N—C₆H₃(Cl)—NH₂ | [structure with CH₃SO₄⊖] | Brown. |
| 13 | H₂NO₂S—C₆H₃(Cl)—NH₂ | [structure with CH₃SO₄⊖] | Orange. |
| 14 | H₃CO—C₆H₄—NH—C₆H₄—NH₂ | [structure with CH₃—C₆H₄—SO₃⊖] | Do. |
| 15 | C₆H₅—C₆H₄—NH₂ | [structure with C₂H₅SO₄⊖] | Yellow. |
| 16 | H₂N—C₆H₄—C₆H₄—NH₂ | [structure with CH₃SO₄⊖] | Orange. |
| 17 | H₂N—C₆H₄—CH₂—C₆H₄—NH₂ | Same as above | Yellow. |
| 18 | NO₂—C₆H₃—N=N—C₆H₂(OCH₃)(CH₃)—NH₂ | ....do.... | Orange. |

EXAMPLE 19

A solution of 17.2 parts of 2,6-dichloro-4-nitroaniline dissolved in 63 parts of conc. sulphuric acid is cooled to 10° C., and this is diazotized with nitrosyl sulphuric acid prepared from 5.8 parts of sodium nitrate and 87 parts of conc. sulphuric acid. After stirring at 8–100 C. for 2 hours, the diazonium salt solution is poured into a solution of 31 parts of the compound of the formula:

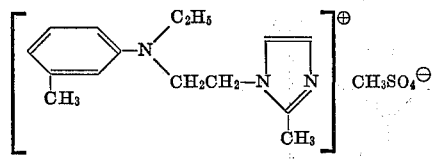

in 220 parts of water and 580 parts of ice, and the whole is stirred for 5 hours at less than 2° C. the dyestuff is salted out with 40 parts of sodium chloride, filtered, and then dried. 44 parts of the dyestuff of the following formula:

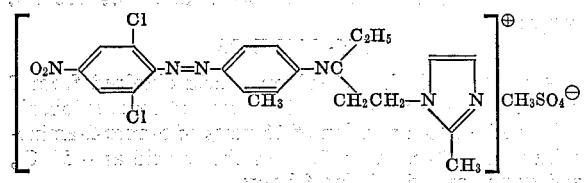

are obtained.

This dyestuff salt is soluble in water with a reddish brown colour, and dyes polyacrylonitrile fibres from a weak acidic bath in brown shades which have good light and wet fastness properties.

The same dyestuff can be prepared by the following procedure: The diazonium salt solution prepared from 17.2 parts of 2,6-dichloro-4-nitroaniline using the procedure given above is poured into a solution of 20.5 parts of the compound of the general formula:

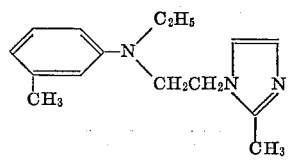

in 220 parts of water, 580 parts of ice and 9.5 parts of hydrochloric acid, and the whole is stirred at less than 2° C. for 2 hours. Into the resulting reaction mixture, 600 parts of ice are added, and further 200 parts of a 40% sodium hydroxide solution are added. After the coupling reaction is completed, 100 parts of a 40% sodium hydroxide solution are added to the mixture to make it alkaline. The precipitate is filtered off and then dried. 34 parts of the dyestuff having the following formula:

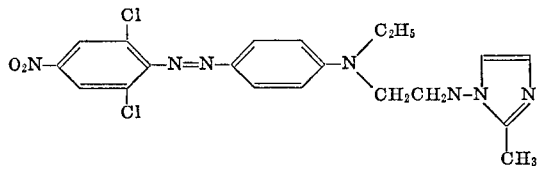

are obtained. The mixture of the dyestuff, 350 parts of chlorobenzene, and 11 parts of dimethyl sulphate is heated at 70–75° C. with stirring for 2 hours. The reaction mass so formed is cooled to room temperature, the precipitate is filtered off, and in order to purify the same, the raw product is dissolved in 550 parts of water at 80° C. A small quantity of insoluble matter is separated by filtration. This dyestuff is equal to the one obtained before.

The azo component used before is prepared by reacting 2-methylimidazole with N - ethyl - N-β-chloroethyl-m-toluidine in the presence of analkaline material. N-ethyl-N-β-(2' - methylimadazolyl-1')ethyl-m-toluidine boils at 214–215° C./10 mm. Hg, which is then treated with dimethyl sulphate to convert it into the quaternary salt.

In a similar manner as in Example 19, using the starting materials shown in the following table, dyestuffs are obtained which have similar dyeing properties. In the right hand column are given the shades of colour of the dyeing on polyacrylonitrile fibres.

71 parts of acrylic amide and 180 parts of glacial acetic acid at 60° C. After stirring at 90–95° C. for 3 hours, the whole is cooled to room temperature, and poured into a solution of 600 parts of water and 250 parts of ice. Into the resulting solution, the diazonium salt solution prepared from 17.3 parts of 2-chloro-4-nitroaniline as in Example 1 is added. After the coupling reaction is completed by the addition of 22 parts of sodium acetate, the dye formed is salted out with 7.5 parts of zinc chloride and 50 parts of sodium chloride, filtered and then dried. 48.6 parts of the dyestuff of the formula:

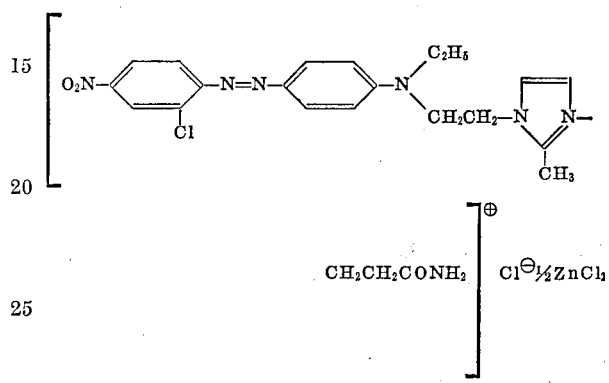

are obtained.

| Ex. | Diazo component | Azo component | Shade |
|---|---|---|---|
| 20 | $O_2N-\langle\rangle-NH_2$, $NO_2$ | phenyl with $N(C_2H_5)(CH_3)$ and $CH_2CH_2-N\langle\text{imidazole}\rangle-CH_3$, $CH_3SO_4^\ominus$ | Bluish red. |
| 21 | $O_2N-\langle\rangle-NH_2$, Br, $NO_2$ | phenyl with $N(C_4H_9)(CH_3)$ and $CH_2CH_2-N\langle\text{imidazole}\rangle-CH_3$, $CH_3SO_4^\ominus$ | Reddish blue. |
| 22 | $O_2N-\langle\rangle-NH_2$, CN | phenyl with $N(CH_3)(CH_3)$ and $CH_2CH_2-N\langle\text{imidazole}\rangle-CH_3$, $CH_3SO_4^\ominus$ | Red. |
| 23 | $O_2N-\langle\rangle-NH_2$, $SO_2CH_3$ | phenyl with $N(CH_2CH_2CN)$ and $CH_2CH_2-N\langle\text{imidazole}\rangle-CH_3$, $Cl^\ominus$ | Red. |
| 24 | $CN-\langle\rangle-NH_2$, Cl, CN | phenyl with $N(C_2H_5)(CH_3)$ and $CH_2CH_2-N\langle\text{imidazole}\rangle-CH_3$, $Cl^\ominus$ | Bordeau. |

EXAMPLE 25

10.7 parts of 36% hydrochloric acid solution are added to a mixture of 23 parts of a compound of the formula:

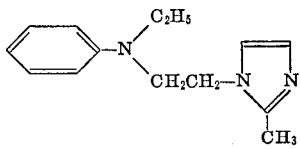

This dyestuff salt dissolves quite readily in water, to give a red solution. It dyes polyacrylonitrile fibres in red shades which have excellent light and wet fastness properties.

EXAMPLE 26

A solution of nitrosyl sulphuric acid obtained from 7 parts of sodium nitrite and 105 parts of conc. sulphuric acid is added to a solution of 15 parts of 5-nitro-2-aminothiazole in 180 parts of 50% sulphuric acid at —5° C., and stirred at —5° C. for 4 hours.

Into the reaction mixture, a solution of 30 parts of the compound of the formula:

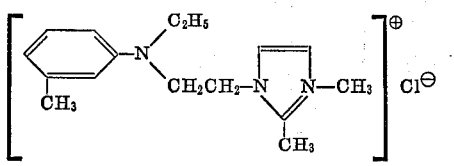

in 200 parts of water and 630 parts of ice is added, and further stirred at less than 0° C. for 5 hours. Then sodium hydroxide solution is added to the mixture to neutralize it, and the dye formed is precipitated with sodium chloride, filtered and then dried. 39 parts of the dyestuff of the formula:

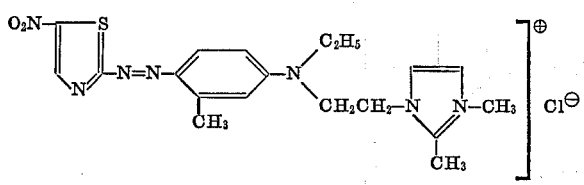

are obtained.

This dyestuff salt dissolves quite readily in water to give a reddish blue solution. It dyes polyacrylonitrile fibres in reddish blue shades which have excellent light and wet fastness properties.

In a similar manner as in Example 26, using the starting materials shown in the following table, dyestuffs are obtained which have similar dyeing properties. In the table, the shades on the polyacrylonitrile fibres are shown in the right-hand column.

mixture at 0–5° C. The reaction mixture thus obtained is gradually poured to a solution of 3.6 parts of the compound of the formula:

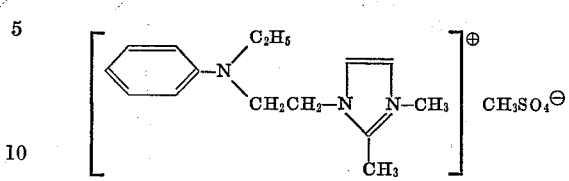

in 40 parts of water and 30 parts of ice, and then stirred for 1 hour. A solution of 4.1 parts of sodium acetate in 20 parts of water is poured to the mixture. After stirring for 10 hours, the dye formed is precipitated with sodium chloride, filtered and then dried. 4.5 parts of the dyestuff of the formula:

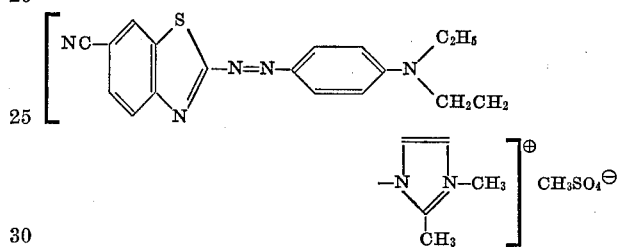

are obtained.

| Ex. | Diazo component | Azo component | Shade |
|---|---|---|---|
| 27 | $O_2N$—S, $H_3C$—N—$NH_2$ | [phenyl-N(CH_3)(CH_2CH_2-N⊕=N-CH_3)(CH_3)] $CH_3SO_4^⊖$ with 3-CH_3 on phenyl | Reddish blue. |
| 28 | phenyl-thiadiazole-$NH_2$ | [phenyl-N(C_2H_5)(CH_2CH_2-N⊕=N-CH_3)(CH_3)] $CH_3SO_4^⊖$ with 3-CH_3 on phenyl | Do. |
| 29 | phenyl-N=N-thiazole-$NH_2$ | [phenyl-N(C_2H_5)(CH_2CH_2-N⊕=N-CH_3)(CH_3)] $CH_3SO_4^⊖$ | Red. |
| 30 | phenyl-triazole-$NH_2$ | Same as above | Yellowish orange. |

EXAMPLE 31

0.76 part of sodium nitrite is gradually added to 9.3 parts of conc. sulphuric acid, heated to 60° C. to dissolve, cooled in ice-bath, and a mixture of acetic acid and propionic acid (5:1 ratio) being free from water is added at less than 10° C.

To the resulting mixture, 1.8 parts of 6-cyano-2-aminobenzothiazole is added at 0–5° C., and further 12 parts of the same mixture of acetic acid and propionic acid is poured. After 3 hours, 0.8 part of urea is added to the This dyestuff salt dissolves quite readily in water to give a red solution. It dyes polyacrylonitrile fibres in red shades, which have excellent light and wet fastness properties.

In similar manner as in Example 31, using the starting materials shown in the following table, dyestuffs are obtained whcih have similar dyeing properties. In the table, shades on polyacrylonitrile fibers are shown in right column.

| Ex. | Diazo component | Azo component | Shade |
|---|---|---|---|
| 32 | 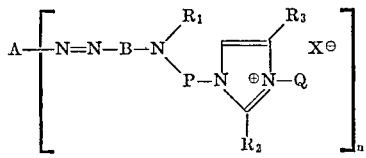 | 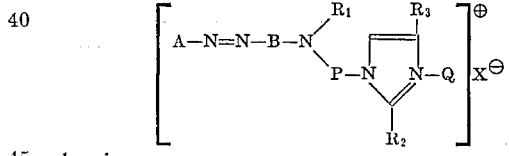 | Red. |
| 33 | | | Bluish red. |
| 34 | | | Do. |
| 35 | | | Red. |
| 36 | | Same as above | Red. |

What is claimed is:

1. A basic dyestuff of the formula:

$$\left[ A-N=N-B-N \underset{R_1}{\overset{}{\underset{}{\bigg\langle}}} \underset{P-N}{\overset{R_3}{\underset{\oplus N-Q}{}}} \underset{R_2}{} \right]_n X^{\ominus}$$

wherein:

A is a residue selected from the group consisting of substituted and unsubstituted benzenes, diphenyls, diphenylmethanes, azobenzenes, thiazoles, benzothiazoles, thiadiazoles, triazoles and derivatives thereof, wherein the substituents are non-water-solubilizing substituents selected from the group consisting of chlorine, bromine, nitrile, nitro, acetyl, trifluoromethyl, lower alkylsulphonyl, sulphonamide, mono- and di-lower alkylsulphonamide, lower alkoxycarbonyl, acetylamino, phenylamino, phenyl, lower alkyl and lower alkoxy, B is a radical selected from the group consisting of substituted and unsubstituted phenylene and naphthylene radicals bonded to the azo and the amino groups in the 1- and 4-positions, wherein the substituents are non-water-solubilizing substituents selected from the group consisting of chlorine, methyl, methoxy and acetylamino, $R_1$ is a member selected from the group consisting of lower alkyl having from 1 to 4 carbon atoms, β-cyanoethyl, β-hydroxyethyl and benzyl, $R_2$ and $R_3$ each is a member selected from the group consisting of hydrogen, methyl, ethyl and phenyl, P is an alkylene radical having from 2 to 3 carbon atoms, Q is a member selected from the group consisting of lower alkyl, benzyl and carbamoylethyl, X is an anion and n is 1 or 2.

2. A basic monoazodye as claimed in claim 1 and having the formula:

$$\left[ A-N=N-B-N \underset{}{\overset{R_1}{\underset{P-N}{}}} \underset{R_2}{\overset{R_3}{\underset{N-Q}{}}} \right] X^{\ominus}$$

wherein

A is selected from the group consisting of a benzene radical and a substituted benzene radical wherein the substituents are free from carboxyl and sulphonyl groups, B is selected from the group consisting of substituted and unsubstituted phenylene radicals bonded to the azo and the amino groups in the 1- and 4-positions, wherein the substituents are free from carboxyl and sulphonyl groups, $R_1$ is a member selected from the group consisting of lower alkyl having from 1 to 4 carbon atoms, β-cyanoethyl, β-hydroxyethyl and benzyl, $R_2$ and $R_3$ each is a member selected from the group consisting of hydrogen, lower alkyl and phenyl, P is an alkylene radical having from 2 to 3 carbon atoms, Q is a member selected from the group consisting of lower alkyl, benzyl and carbamoyl ethyl, and X is an anion.

3. A basic monoazodye as in claim 2, wherein A is a substituted benzene radical, the substituents being selected from the group consisting of chlorine, bromine, nitro, acetyl, trifluoromethyl, lower alkylsulphonyl, sulphonamide, mono- and di-lower alkylsulphonamide, lower alkoxycarbonyl, acetylamino, phenylamino, phenyl, lower alkyl and lower alkoxy.

4. A basic monoazodye as in claim 2, wherein B is a substituted phenylene radical, the substituents being selected from the group consisting of chlorine, methyl, methoxy and acetylamino.

5. A basic monoazodye as claimed in claim 1 and having the formula:

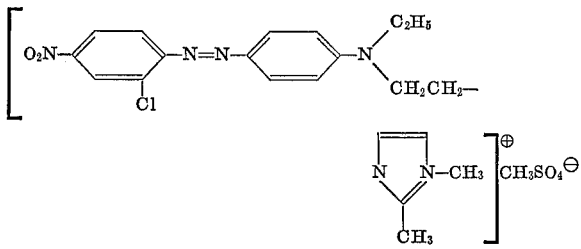

6. A basic monoazodye as claimed in claim 1 and having the formula:

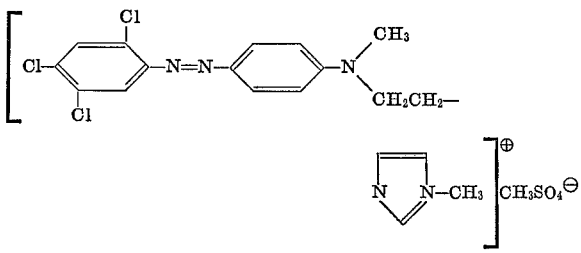

7. A basic monoazodye as claimed in claim 1 and having the formula:

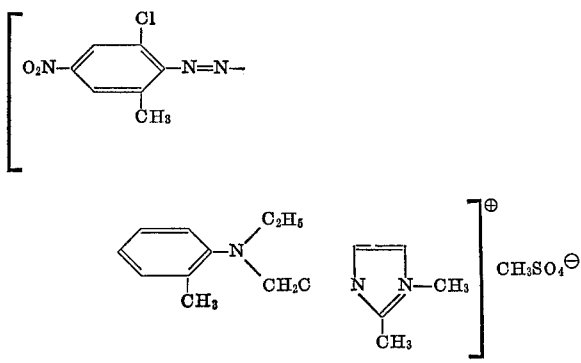

8. A basic monoazodye as claimed in claim 1 and having the formula:

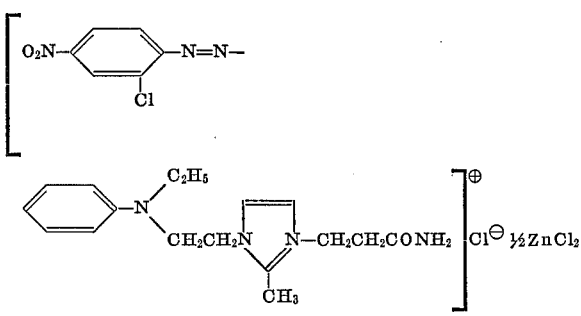

9. A basic monoazodye as claimed in claim 1 and having the formula:

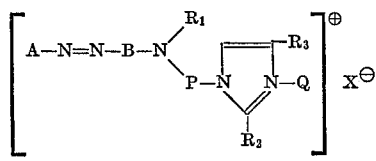

wherein:

A is selected from the group consisting of substituted and unsubstituted thiazole and benzothiazole radicals, wherein the substituents are free from sulphonyl and carbonyl groups, B is selected from the group consisting of a phenylene and a substituted phenylene radical bonded to the azo and the amino groups in the 1- and 4-positions, wherein the substituents are free from carboxyl and sulphonyl groups, $R_1$ is a member selected from the group consisting of lower alkyl having from 1 to 4 carbon atoms, β-cyanoethyl, β-hydroxyethyl and benzyl, $R_2$ and $R_3$ each is a member selected from the group consisting of hydrogen, lower alkyl and phenyl, P is a member selected from the group consisting of an alkylene radical having from 2 to 3 carbon atoms, Q is a member selected from the group consisting of lower alkyl, benzyl and carbamoyl ethyl, and X is an anion.

10. A basic monoazodye as in claim 9, wherein A is selected from the group consisting of substituted thiazole and benzothiazole radicals, the substituents being selected from the group consisting of chlorine, bromine, nitrile, nitro, acetyl, trifluoromethyl, lower alkylsulphonyl, sulphonamide, mono- and di-lower alkylsulphonamide, lower alkoxycarbonyl, acetylamino, phenylamino, phenyl, lower alkyl and lower alkoxy.

11. A basic monoazodye as in claim 9, wherein B is a substituted phenylene radical, and substituents being selected from the group consisting of chlorine, methyl, methoxy and acetylamino.

12. A basic monoazodye as claimed in claim 1 and having the formula:

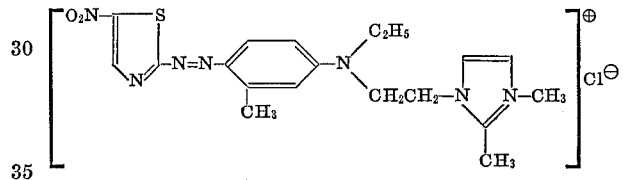

13. A basic monoazodye as claimed in claim 1 and having the formula:

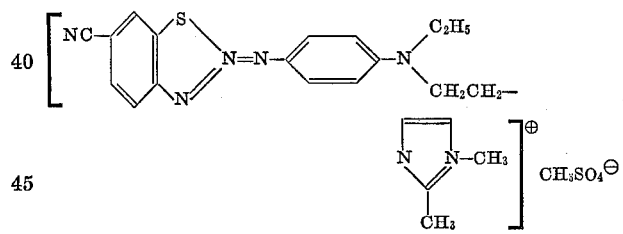

14. A basic monoazodye as claimed in claim 1 and having the formula:

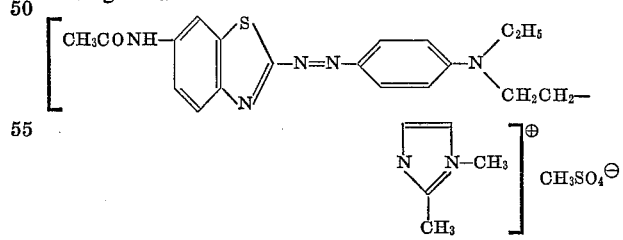

References Cited

UNITED STATES PATENTS

| | | | |
|---|---|---|---|
| 3,102,879 | 9/1963 | Baumann et al. | 260—157 |
| 3,213,080 | 10/1965 | Bloom et al. | 260—157X |
| 3,216,995 | 11/1965 | Baumann et al. | 260—157 |
| 3,294,777 | 12/1966 | Hansen et al. | 260—157 |
| 3,349,096 | 10/1967 | Rooney | 260—157X |
| 3,409,606 | 11/1968 | Lutz et al. | 260—157 |

FLOYD D. HIGEL, Primary Examiner

U.S. Cl. X.R.

8—4, 7, 13, 41, 50; 260—40, 158, 309